(12) United States Patent
Burton (10) Patent No.: US 10,556,546 B2
(45) Date of Patent: Feb. 11, 2020

(54) TUBE MOUNTS FOR USE ON TUBULAR FEATURES OF VEHICLES TO MOUNT A VARIETY OF VEHICLE ACCESSORIES

(71) Applicant: Thomas Burton, Oak Hill, WV (US)

(72) Inventor: Thomas Burton, Oak Hill, WV (US)

( * ) Notice: Subject to any disclaimer, the term of this patent is extended or adjusted under 35 U.S.C. 154(b) by 0 days.

(21) Appl. No.: 15/493,473

(22) Filed: Apr. 21, 2017

(65) Prior Publication Data

US 2018/0304819 A1  Oct. 25, 2018

(51) Int. Cl.
  *B60R 9/058* (2006.01)

(52) U.S. Cl.
  CPC .................................. *B60R 9/058* (2013.01)

(58) Field of Classification Search
  CPC .. B60R 11/04; B60R 9/00; B60R 9/10; B60R 16/0215; B60R 9/045; B60R 9/048; B60R 9/0485; B60R 9/06; B60R 9/058; B60R 9/04; B60R 2011/0059; B60R 11/00; B60R 9/08; B60P 3/073; F32L 2/00; F21V 21/088; F16M 13/022; Y20T 24/44573; F16B 2/02; F16B 280/769; F16B 2/06; F16B 9/023
  USPC ........................................................ 280/769
  See application file for complete search history.

(56) References Cited

U.S. PATENT DOCUMENTS

| | | |
|---|---|---|
| 3,851,979 A | 12/1974 | Becker |
| D319,966 S | 9/1991 | Ellison |
| 5,806,905 A * | 9/1998 | Moore .................. B60R 9/00 296/3 |
| 7,014,398 B1 | 3/2006 | Hellwig |
| D539,639 S | 4/2007 | Nagle |
| 7,481,247 B2 | 1/2009 | Friedline et al. |

(Continued)

FOREIGN PATENT DOCUMENTS

FR  2270472 A1  12/1975

OTHER PUBLICATIONS

Shotgunworld.com, Barrel mount for weaver rail??? (online forum) [retrieved from internet on May 24, 2018]<URL: http://www.shotgunworld.com/bbs/viewtopic.php?t=209505> (Year: 2010).*

(Continued)

*Primary Examiner* — Paul N Dickson
*Assistant Examiner* — Hilary L Johns
(74) *Attorney, Agent, or Firm* — Dorsey & Whitney LLP (57) ABSTRACT

A mount is disclosed for attaching a fixture to a tubular structure. The mount includes an extended mounting member having an inner surface shaped to conform to the tubular structure, and a flat outer surface having a plurality of attachment locations for facilitating attachment of the fixture to the extended mounting member. The mount also includes a plurality of securing members having an inner surface shaped to conform to the tubular structure, each securing member removably attachable to the extended mounting member so as to removably secure the extended mounting member to the tubular structure. The flat outer surface of the extended mounting member includes a plurality of mounting holes to accept bolts to attach the fixture thereto, or the flat outer surface can have an L-track tie-down rail formed therein to secure easily removable L-track fasteners attached to the fixture to attach the fixture to the extended mounting member.

19 Claims, 4 Drawing Sheets

(56) References Cited

U.S. PATENT DOCUMENTS

| | | | |
|---|---|---|---|
| 2005/0217161 A1* | 10/2005 | Haugen | F41A 21/08 |
| | | | 42/124 |
| 2009/0096236 A1 | 4/2009 | Hawley | |
| 2010/0288808 A1* | 11/2010 | Marr, Jr. | B60R 9/00 |
| | | | 224/403 |
| 2014/0252188 A1 | 9/2014 | Webster | |
| 2017/0050577 A1 | 2/2017 | Lindholm et al. | |

OTHER PUBLICATIONS http://www.tonneaupros.com/p-339-tracac-t-rac-truck-rack.aspx, Downloaded Aug. 5, 2015 TracRac T-Rac G2 fixed truck rack kit.
http://eastsidecustomtruck.com/i-60474-tube-clamps-external.html, Downloaded Aug. 5, 2015 Tube Clamp.
Shotgunworld.com, Barrel mount for weaver rail??? (online forum) [retrieved from internet on May 24, 2018], http://www.shotgunworld.com/bbs/viewtopic.php?t=209505 (3 pages).
International Search Report and Written Opinion of the International Searching Authority for International Patent Application No. PCT/US2018/028667, dated Jun. 19, 2018 (14 pages).

* cited by examiner

TUBE MOUNTS FOR USE ON TUBULAR FEATURES OF VEHICLES TO MOUNT A VARIETY OF VEHICLE ACCESSORIES

FIELD

This invention relates generally to attaching accessories to vehicles, and particularly to mounting systems for attaching accessories to tubular features of vehicles.

BACKGROUND

Tubular systems are often used in the off-road community. For example, front and rear bumpers of off-road vehicles can be protected by tubular guard structures. Both civilian and military vehicles use tubular chassis for the rigidity and strength of a tubular chassis.

Existing mounting options are single-use devices for mounting only one item. Further, typically the mounting option is one of two types. One type requires drilling a hole in the tubular structure to allow for hardware and brackets to be affixed. The other type requires that a mounting bracket be welded to the tubular structure, making it a permanent attachment. However, both of these types are unacceptable because they disrupt the integrity of the tubular frame structure, and are not easily removable without leaving permanent damage to the tubular frame.

Mounting brackets exist for automotive roll bars, or similar articles. However, regarding the device taught in U.S. D319966 S, the flat mounting surface of this device can only accommodate one attachment bolt, thereby allowing for the mounting of only one item. Further, the device includes two joining bolts having exposed bolt ends, each exposed bolt end being secured with a nut. But, such an exposed bolt end presents a possible safety hazard that can limit the use of the device.

SUMMARY

The tube mounts of the invention provide a mounting device able to mount equipment and items that require frequent easy attachment, and easy and quick removal. The tube mounts of invention are easily removable, are modular, and have interchangeable parts and mounting features that can adapt to many devices that are useful on a vehicle. For example, the tube mounts can provide mounting options for both subcomponents on tube chassis vehicles, as well as for aftermarket accessories for recovery gear, weapon mounts, and personal equipment.

The tube mounts can be made for use on any diameter and any length tubular system for the purpose of providing mounting points for a plurality of fixtures. The tube mounts can be made for use on any cross-sectional shape tubular system, such as round, square, triangular, and hexagonal, for example.

The tube mounts can meet several needs that are currently not being met by known devices. The tube mounts are characterized by ease of installation, being non-invasive, non-destructive, interchangeable, and modular. The tube mounts are rapidly and easily adaptable to many uses and applications.

The tube mounts can be made in various lengths, such as 6 in, 12 in, 24 in lengths, and shorter or longer if needed. The tube mounts are easy installed and removed using one hand tool. This allows for the tube mounts to be easily moved from one location to another, so as to meet rapidly changing needs and circumstances. No drilling or welding is required to affix the tube mount to an object to be mounted, or to a tubular structure.

The tube mounts allow for the spreading of weight loads when items are affixed to them, as well as being low-profile and smooth enough to not present obstructions, not present sharp edges, and not present dangerous snag hazards.

The tube mounts can be used in many applications from mounting a single item to mounting multiple items that are to be used in conjunction with each other while being held in place.

The tube mounts of the invention provide easy and removable installation to tube structures, and facilitate easy and removable attachment of objects to the tube mount. The tube mounts provide many options for the user, and are modular enough to adapt to more than one configuration so as to meet a wide variety of needs of the user.

A general aspect of the invention is a tube mount for use on a tubular component of a vehicle. The tube mount includes an extended mounting member having an outer surface presenting an L-track tie-down rail having a plurality of mounting locations along the extended mounting member; an inner surface configured to fit onto a tubular component of a vehicle; and two mating surfaces, each mating surface extending along and between the inner surface and the outer surface, each mating surface having a plurality of attachment holes; a plurality of securing members, each securing member having: an inner surface configured to fit onto the tubular component of the vehicle; an outer surface of the same shape as the inner surface; and two mating surfaces, each mating surface extending between the inner surface and the outer surface, each mating surface having an attachment hole; and a plurality of attachment elements configured to extend through each attachment hole of each securing member, and to attach securely inside a corresponding attachment hole of the extended mounting member so as to securely trap the tubular structure between the plurality of securing members and the extended mounting member, the plurality of securing members thereby securely attaching the extended mounting member to the tubular structure.

In some embodiments, each attachment element is threaded, each attachment hole of the extended mounting member is correspondingly threaded, and each securing member can be urged towards the extending mounting element, thereby securing the tube mount to the tubular component of the vehicle.

In some embodiments, the inner surface of the extended mounting member is configured to fit onto a tubular component having a round cross-section, and the inner surface of each securing member is configured to fit onto the tubular component having a round cross-section.

In some embodiments, the inner surface of the extended mounting member is configured to fit onto a tubular component having a square cross-section, and the inner surface of each securing member is configured to fit onto the tubular component having a square cross-section.

In some embodiments, the L-track tie-down rail is an airline-style L-track tie-down rail.

Another general aspect of the invention is a tube mount for use on a tubular component of a vehicle. This tube mount includes: an extended mounting member having: an outer surface including a flat portion presenting a plurality of threaded mounting holes for SAE or Metric bolts spaced along the extended mounting member; an inner surface configured to fit onto a tubular component of a vehicle; and two mating surfaces, each mating surface extending along and between the inner surface and the outer surface, each mating surface having a plurality of attachment holes; a plurality of securing members, each securing member having: an inner surface configured to fit onto the tubular component of the vehicle; an outer surface of the same shape as the inner surface; and two mating surfaces, each mating surface extending between the inner surface and the outer surface, each mating surface having an attachment hole; and a plurality of attachment elements configured to extend through each attachment hole of each securing member, and to attach securely inside a corresponding attachment hole of the extended mounting member so as to securely trap the tubular structure between the plurality of securing members and the extended mounting member, the plurality of securing members thereby securely attaching the extended mounting member to the tubular structure.

In some embodiments, each attachment element is threaded, each attachment hole of the extended mounting member is correspondingly threaded, and each securing member can be urged towards the extending mounting element, thereby securing the tube mount to the tubular component of the vehicle.

In some embodiments, the inner surface of the extended mounting member is configured to fit onto a tubular component having a round cross-section, and the inner surface of each securing member is configured to fit onto the tubular component having a round cross-section.

In some embodiments, the inner surface of the extended mounting member is configured to fit onto a tubular component having a square cross-section, and the inner surface of each securing member is configured to fit onto the tubular component having a square cross-section.

Another general aspect of the invention is a device for mounting a fixture onto a tubular structure of a vehicle. This device includes: an extended mounting member having an inner surface shaped to fit onto a span along an outer surface of the tubular structure, and having a flat outer mounting portion configured to mount the fixture; and a plurality of securing members, each securing member having an inner surface shaped to fit onto an outer surface of the tubular structure at a respective location along the extended mounting member, each securing member also being configured to be attached at the respective location to the extended mounting member such that the tubular structure is securely trapped between the securing member and the extended mounting member, the plurality of securing members thereby securely attaching the extended mounting member to the tubular structure.

In some embodiments, each securing member includes a recess at each end for receiving a fastener.

In some embodiments, the flat outer mounting portion of the extended mounting member has a plurality of mounting holes configured to accept bolts to couple the fixture to be mounted on the tubular structure to the extended mounting member.

In some embodiments, the flat outer mounting portion of the extended mounting member has an L-track tie down rail configured to accept L-track fasteners to couple the fixture to be mounted on the tubular structure to the extended mounting member.

In some embodiments, the inner surface of both the extended mounting member and each securing member is rounded, so as to conform to a tubular structure having a round cross-section.

In some embodiments, the inner surface of both the extended mounting member and each securing member is squared, so as to conform to a tubular structure having a square cross-section.

Another general aspect of the invention is a mount for attaching a fixture to a tubular structure. The mount includes: an extended mounting member having an inner surface shaped to conform to the tubular structure, and a flat outer surface having a plurality of attachment locations, each attachment location configured to facilitate attachment of the fixture to the extended mounting member; and a plurality securing members, each securing member having an inner surface shaped to conform to the tubular structure, and each securing member being configured to removably attach to the extended mounting member at a position along the extended mounting member so as to removably secure the extended mounting member to the tubular structure, thereby securing the fixture to the tubular structure.

In some embodiments, the flat outer surface of the extended mounting member includes: one or more mounting holes configured to accept bolts to couple the extended mounting member to the fixture to be mounted on the tubular structure.

In some embodiments, the flat outer surface of the extended mounting member includes: an L-track tie-down rail configured to accept L-track fasteners attached to the fixture to be mounted on the tubular structure.

In some embodiments, the extended mounting member has an inner surface shaped to mate with a tubular structure having a round cross-section.

In some embodiments, the extended mounting member has an inner surface shaped to mate with a tubular structure having a square cross-section.

BRIEF DESCRIPTION OF THE DRAWINGS

The invention will be more fully understood from the following Detailed Description, in conjunction with the following figures, wherein.

DETAILED DESCRIPTION

Figure 1:
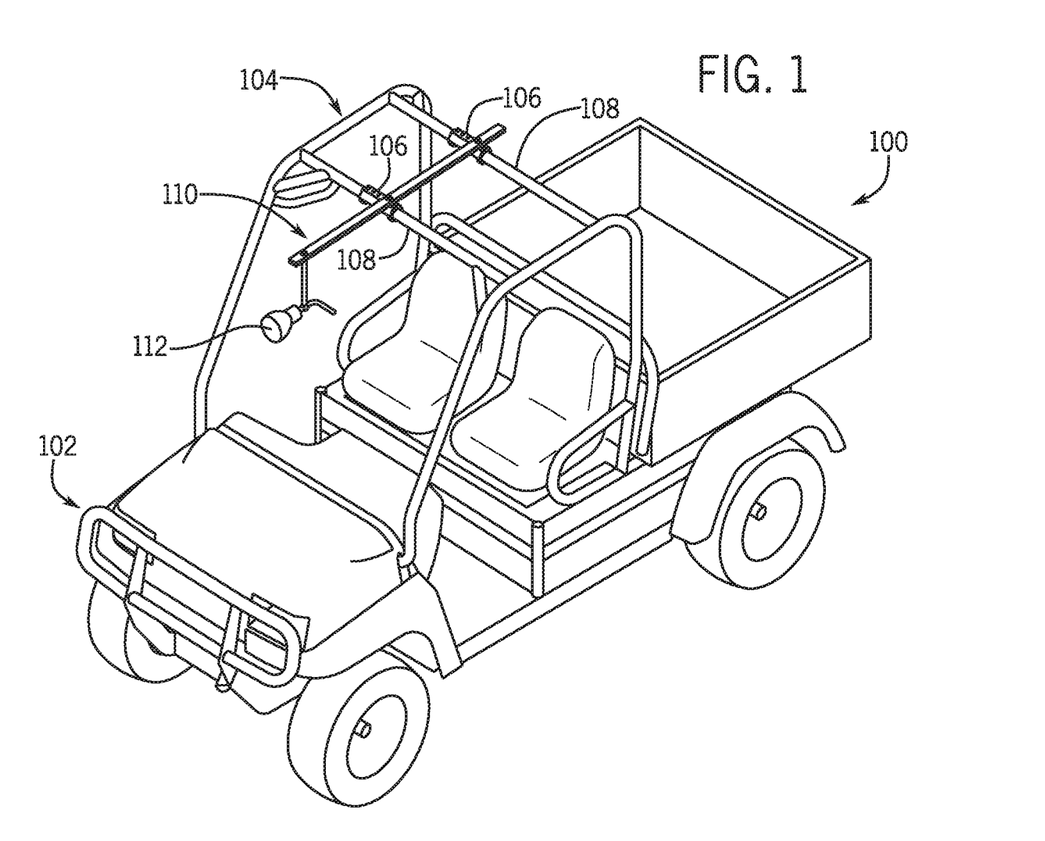
FIG. 1 is an isometric view of a vehicle with various tubular components, including a front grille guard tubular structure, and a tubular roll cage, showing two tube mounts of the invention, each tube mount being attached to a tube of the tubular roll cage, and showing an accessory bar mounted to and across each of the tube mounts, the accessory bar supporting a search light.

With reference to FIG. 1, a vehicle 100 is shown with various tubular components, including a front grille guard tubular structure 102, and a tubular roll cage 104. There are two tube mounts 106 of the invention attached to a tube 108 of the tubular roll cage 104. An accessory bar 110 is mounted to and across each of the tube mounts 106. The accessory bar 110 supports a search light 112 in this illustration, although the bar 110 could support other accessories, such as a siren, or a flashing red light, for example. One or more tube mounts 106 could be attached to various places along the tubes that make up the front grille guard tubular structure 102, and to various places along the tubular roll cage 104.

Figure 2:
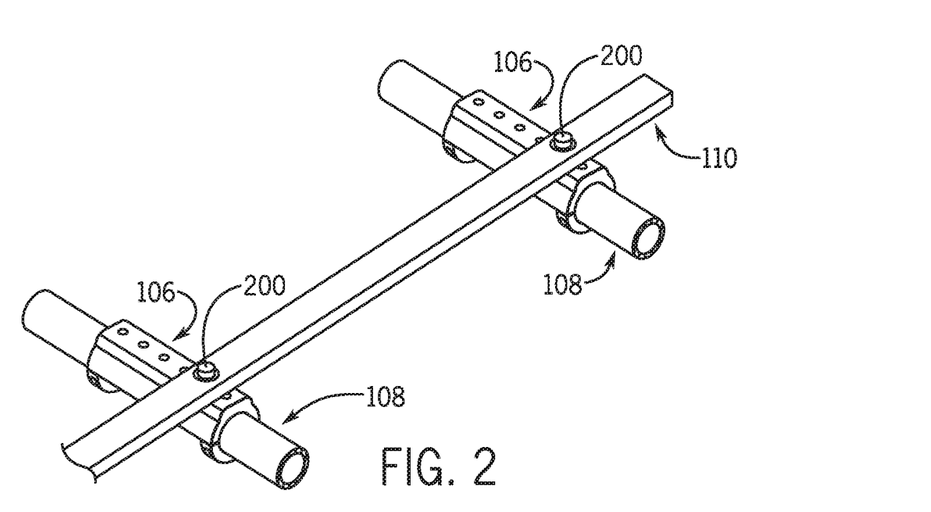
FIG. 2 is a closer isometric view of the accessory bar mounted to an across each of the tube mounts of FIG. 1.

FIG. 2 shows a closer view of the accessory bar 110 mounted to and across each of the tube mounts 106. The accessory bar 110 is attached to each tube mount 106 using a threaded bolt 200.

Figure 3:
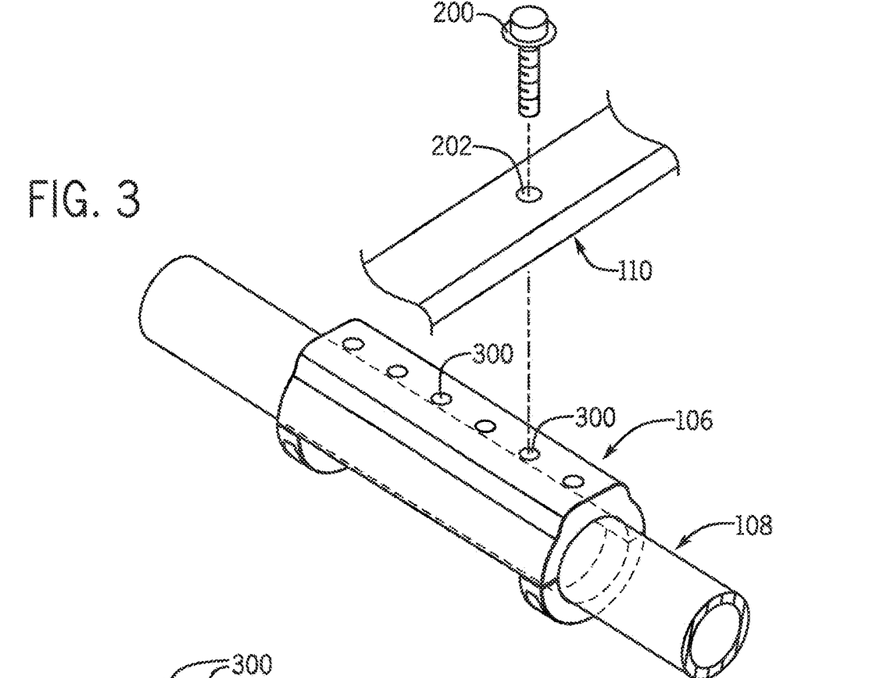
FIG. 3 is an exploded isometric view of one of the tube mounts of FIG. 2, showing how the accessory bar is mounted to the tube mount using a bolt and one of a plurality of threaded mounting holes.

FIG. 3 shows one of the tube mounts 106 attached to a tube 108, showing how the accessory bar 108 is mounted to the tube mount 106 using a threaded bolt 200 that extends through a hole 202 in the bar 110, and is then secured by screwing into one of a plurality of threaded mounting holes 300 of the tube mount 106.

Figure 4:
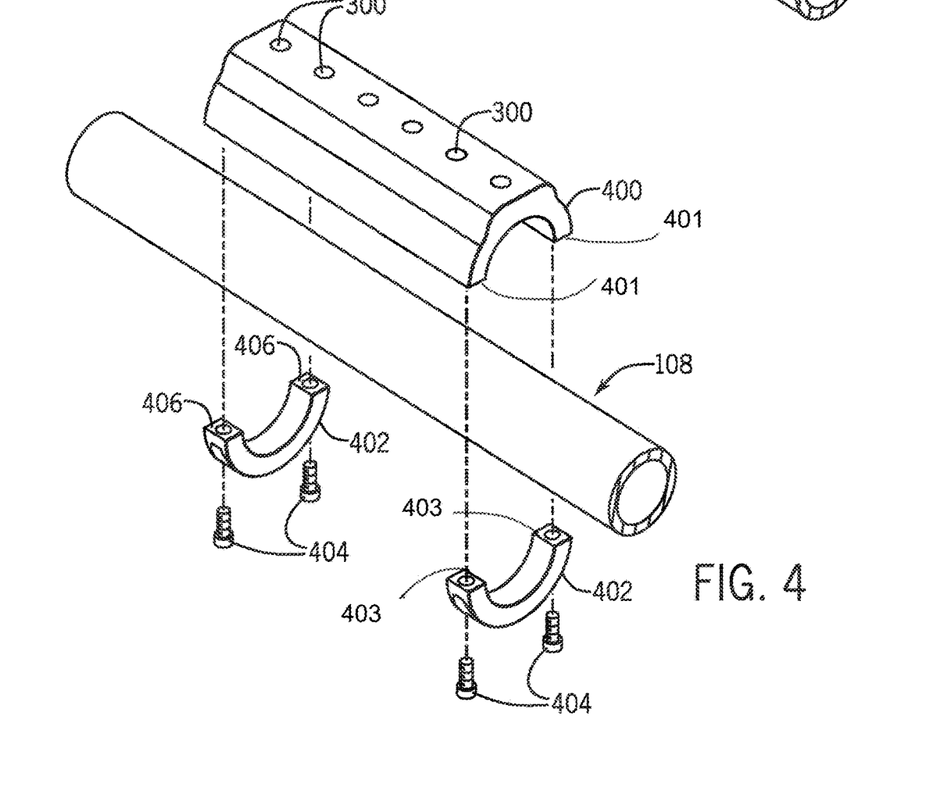
FIG. 4 is an exploded isometric view of the tube mount of FIG. 3, showing the parts of the tube mount: an extended mounting member, a pair of securing members, each securing member being secured to the extended mounting member and to the tube using a pair of screws.

FIG. 4 shows the tube mount 106 in an exploded view that reveals the parts of the tube mount 106: an extended mounting member 400 and a pair of securing members 402. The tube mount 106 includes an extended mounting member 400 having an outer surface including a flat portion presenting a plurality of threaded mounting holes 300 for SAE or Metric bolts spaced along the extended mounting member 400; an inner surface configured to fit onto a tubular component of a vehicle; and two mating surfaces 401, each mating surface 401 extending along and between the inner surface and the outer surface, each mating surface having a plurality of attachment holes. Each securing member 402 may have an inner surface configured to fit onto the tubular component of the vehicle; an outer surface of the same shape as the inner surface; and two mating surfaces 403, each mating surface extending between the inner surface and the outer surface, each mating surface having an attachment hole. Each securing member 402 is secured to the extended mounting member 400 and to the tube 108 using a pair of screws 404. Each screw 404 extends through a hole 406 at each end of a securing member 402, and then screws into a respective threaded hole (not shown) under the extended mounting member 400.

Figure 5:
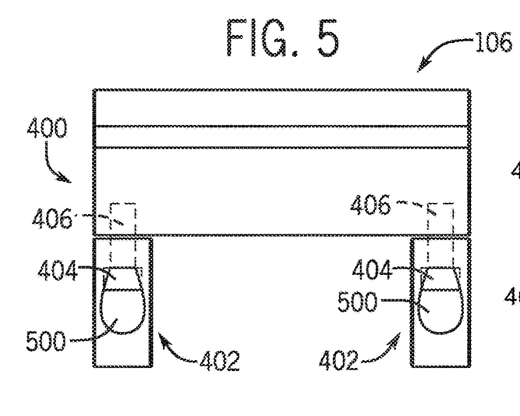
FIG. 5 is front view of the tube mount of FIG. 3, showing a recess in each securing member for accommodating a screw.

FIG. 5 shows both ends of a tube mount 106, showing a recess in each securing member 402 for accommodating a respective screw 404. Also shown are the respective threaded holes 406 into which each screw 404 screws into under the extended mounting member 400.

Figure 6:
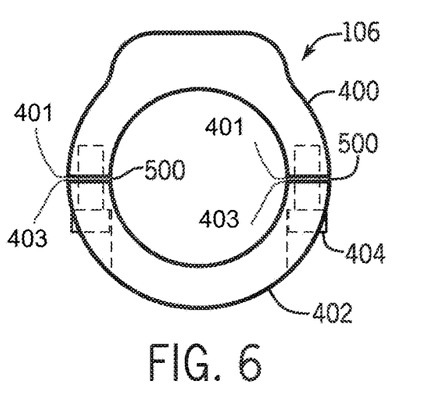
FIG. 6 is a side view of the tube mount of FIG. 5, showing the two screws used to secure a securing member to the extended mounting member.

FIG. 6 is a side view of the tube mount 106, showing the two screws 404 used to secure a securing member 402 to the extended mounting member 400. Note that the gap 500 between the ends of the securing members 402 and the extended mounting member 400 is almost closed when the screws 404 are fully screwed into the respective threaded holes 406, thereby causing the securing members 402 to securely clamp onto and capture the pipe 108, which effectively mounts the tube mount 106 onto the pipe 108.

Figure 7:
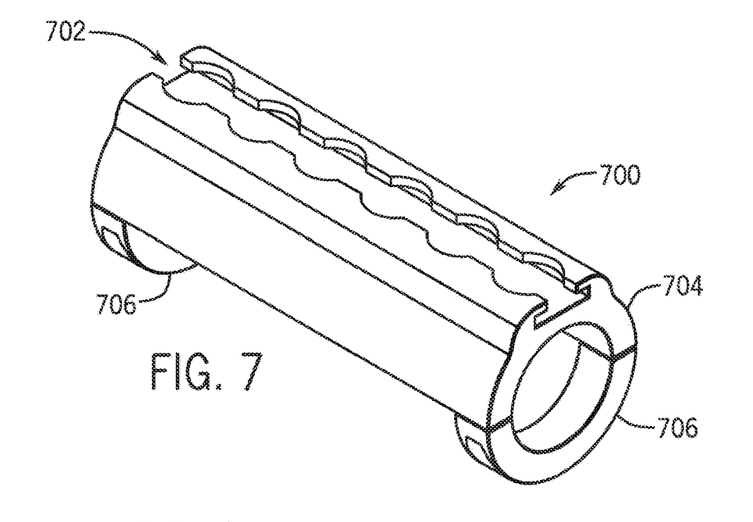
FIG. 7 is an isometric view of another embodiment of a tube mount having an L-track tie-down rail formed in an outer surface of the extended mounting member, the L-track tie-down rail being able to accept at least one L-track fastener attached to a fixture to be mounted to the tube mount.

FIG. 7 shows another embodiment of a tube mount 700 having an L-track tie-down rail 702 formed in an outer surface of the extended mounting member 704. The L-track tie-down rail 702 is able to accept at least one L-track fastener (not shown) attached to a fixture (not shown) to be mounted to the tube mount 700. This tube mount 700 is attached to a round cross-section tube using the securing members 706.

An L-track is a quick release rail system that requires no tools to attach to the tube mount. This embodiment allows for quick removal of items mounted to a tube when the user is in a hurry.

Also known as logistic track, L-track is a versatile tie down system of aluminum rails, fittings, and straps to secure a range of cargo. L-track adjustable cargo tie down rails can be installed anywhere cargo or equipment needs to be secured quickly and easily. The multiple round openings on the rails allow for quick attachment of spring fittings so a custom tie down can be performed at any point along the rail.

L-track tie down rails were made popular in the airline industry as a way to secure seats, but the versatility of this aluminum tracking makes it an excellent choice for many consumer, industrial, or military tie downs uses. More heavy-duty than regular L-track, airline-style L-track can be made from high quality grade 6351 aluminum and can have a width of 1⅜".

Figure 8:
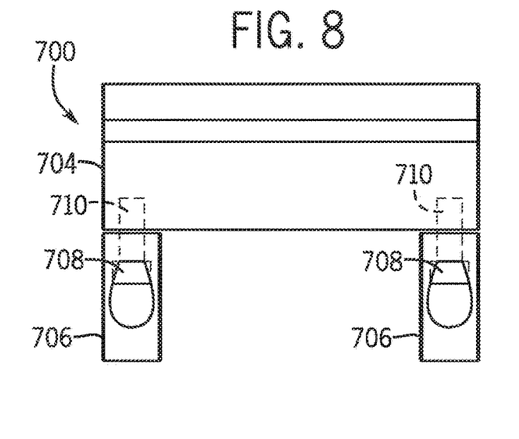
FIG. 8 is front view of the tube mount of FIG. 7, showing a recess in each securing member for accommodating a screw.

FIG. 8 shows both ends of a tube mount 700, showing a recess in each securing member 706 for accommodating a respective screw 708. Also shown are the respective threaded holes 710 into which each screw 708 screws into under the extended mounting member 704.

Figure 9:
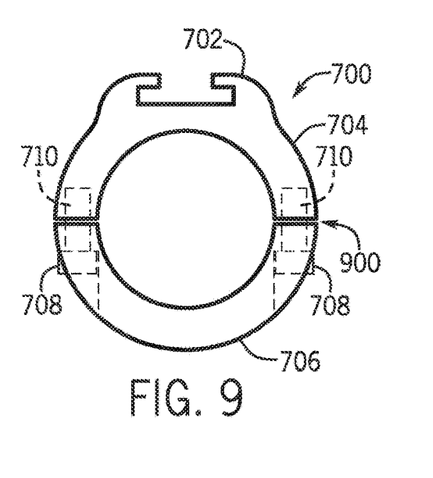
FIG. 9 is a side view of the tube mount of FIG. 8, showing the two screws used to secure a securing member to the extended mounting member.

FIG. 9 is a side view of the tube mount 700, showing the two screws 708 used to secure a securing member 706 to the extended mounting member 704. Note that the gap 900 between the ends of the securing members 706 and the extended mounting member 704 is almost closed when the screws 708 are fully screwed into the respective threaded holes 710, thereby causing the securing members 706 to securely clamp onto and capture the pipe 108, which effectively mounts the tube mount 700 onto the pipe 108.

Figure 10:
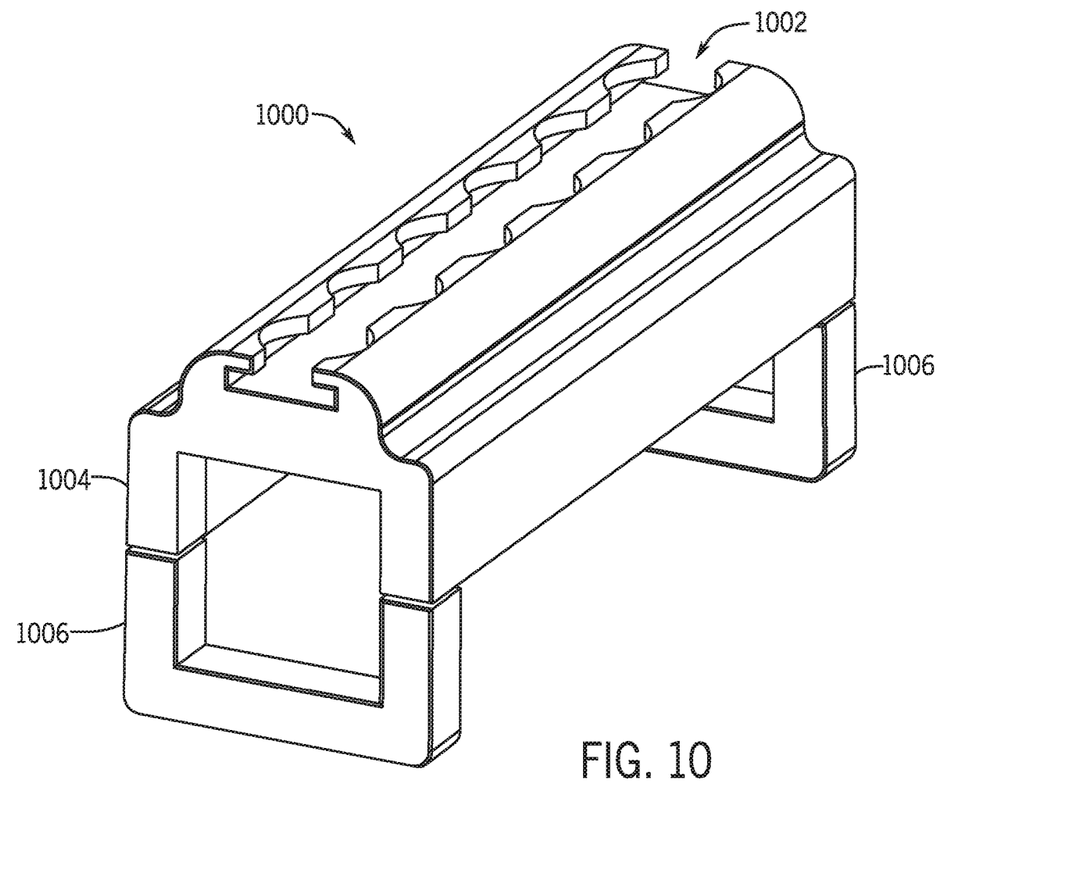
FIG. 10 is an isometric view of another embodiment of a tube mount having an L-track tie-down rail formed in an outer surface of the extended mounting member, this tube mount having an inner surface shaped for attachment to tubes with a square cross-section.

FIG. 10 shows yet another embodiment of a tube mount 1000 having an L-track tie-down rail 1002 formed in an outer surface of the extended mounting member 1004. The L-track tie-down rail 1002 is able to accept at least one L-track fastener (not shown) attached to a fixture (not shown) to be mounted onto the tube mount 1000. The extended mounting member 1004 of this tube mount 1000 has an inner surface shaped for attachment to tubes with a square cross-section using the securing members 1006. Each securing member 1006 also has an inner surface shaped for attachment to tubes with a square cross-section.

One of average skill in the art will understand that variations of the shapes of pieces described and shown herein, the locations of boreholes, the external surface shapes of the extended mounting members and the securing members, and where and how components mate together can be varied from what is shown in the Figures as mere design and/or engineering choices that still fall within the scope of the invention as claimed. Thus, what is described and shown herein is exemplary only, and other shapes and configurations are possible within the scope of the claims set forth below. For example, although round and square inner surfaces are shown, so as to conform to round and square tubes, other cross-sectional shapes are possible, such as ellipsoidal, rectangular, triangular, hexagonal, octagonal, or any other desired cross-sectional shape.

Other modifications and implementations will occur to those skilled in the art without departing from the spirit and the scope of the invention as claimed. Accordingly, the above description is not intended to limit the invention, except as indicated in the following claims.

What is claimed is:

1. A device for mounting a fixture onto a tubular structure of a vehicle, the device comprising
   an extended mounting member having an inner surface defining a channel with opposing inner surfaces shaped to fit onto a span along an outer surface of the tubular structure, wherein
   the opposing inner surfaces are configured for contact with the span along an entire length of the extended mounting member, and
   the extended mounting member has a flat outer mounting portion configured to mount the fixture; and
   a plurality of securing members, wherein
   each securing member has an inner surface shaped to fit onto an outer surface of the tubular structure at a respective location along the extended mounting member; and
   each securing member configured to attach to the extended mounting member at the respective location such that the tubular structure is securely trapped between the securing member and the extended mounting member, whereby
   the plurality of securing members are thereby configured to securely attach the extended mounting member to the tubular structure.

2. The device of claim 1, wherein
   the extended mounting member further comprises
   two mating surfaces, wherein each mating surface extends along and between the inner surface of the extended mounting member and the and the flat mounting portion and each mating surface having defines a plurality of attachment holes;
   each securing member having further comprises
   an outer surface; and
   two mating surfaces, wherein each mating surface extends between the inner surface and the outer surface and each mating surface defines an attachment hole; and
   the device further comprises a plurality of attachment elements configured to extend through each attachment hole of each securing member and to attach securely inside a corresponding attachment hole of the extended mounting member co as to securely trap the tubular structure between the plurality of securing members and the extended mounting member.

3. The device of claim 2, wherein each attachment element is threaded, each attachment hole of the extended mounting member is correspondingly threaded, and whereby engaging threading of each attachment element with threading of a corresponding attachment hole, each securing member can be urged towards the extending mounting element, thereby securing the device to the tubular structure of the vehicle.

4. The device of claim 1, wherein
   the inner surface of the extended mounting member is arcuate in cross section transverse to the length of the extended mounting member to conform to the tubular structure having a circular cross-section, and
   the inner surface of each securing member is curved to conform to the tubular component structure having the circular cross-section.

5. The device of claim 1, wherein each securing member includes opposing ends for connecting with the extended mounting member on opposing sides of the tubular structure and further defines a recess at each opposing end for receiving a fastener.

6. The device of claim 1, wherein the flat outer mounting portion of the extended mounting member has a plurality of mounting holes configured to accept bolts to couple the fixture to be mounted on the tubular structure to the extended mounting member.

7. The device of claim 1, wherein the flat outer mounting portion of the extended mounting member defines an L-track tie down rail configured to accept L-track fasteners at a plurality of locations along the extended mounting member to couple the fixture to be mounted on the tubular structure to the extended mounting member.

8. The device of claim 7, wherein the L-track tie-down rail is an airline-style L-track tie-down rail.

9. The device of claim 1, wherein
   the inner surface of the extended mounting member is rectangular in cross section transverse to the length of the extended mounting member to conform to the tubular structure having a rectangular cross-section; and
   the inner surface of each securing member is rectangular to conform to the tubular structure having the rectangular cross-section.

10. The device of claim 1, wherein the extended mounting member is monolithic in construction.

11. A tube mount for use on a tubular component of a vehicle, the tube mount comprising
    a monolithic extended mounting member having
    an outer surface including a flat portion presenting a plurality of threaded mounting holes for threaded bolts spaced along the extended mounting member;
    an inner surface configured to fit onto a tubular component of a vehicle; and
    two mating surfaces, each mating surface extending along and between the inner surface and the outer surface, each mating surface having a plurality of attachment holes;
    a plurality of securing members, each securing member having
    an inner surface configured to fit onto the tubular component of the vehicle;
    an outer surface; and
    two mating surfaces, each mating surface extending between the inner surface and the outer surface, each mating surface having an attachment hole; and
    a plurality of attachment elements configured to extend through each attachment hole of each securing member, and to attach securely inside a corresponding attachment hole of the extended mounting member so as to securely trap the tubular structure between the plurality of securing members and the extended mounting member, the plurality of securing members thereby securely attaching the extended mounting member to the tubular structure; wherein the inner surface of both the extended mounting member and each securing member is rounded, so as to conform to a tubular structure having a round cross-section.

12. The tube mount of claim 11, wherein each attachment element is threaded, each attachment hole of the extended mounting member is correspondingly threaded, and each securing member can be urged towards the extending mounting element, thereby securing the tube mount to the tubular component of the vehicle.

13. The tube mount of claim 11, wherein the inner surface of the extended mounting member is configured to fit onto a tubular component having a round cross-section, and the inner surface of each securing member is configured to fit onto the tubular component having a round cross-section.

14. A mount for attaching a fixture to a tubular structure, the mount comprising
an extended mounting member having an inner surface with opposing inner surfaces shaped to conform to the tubular structure, along an entire length of the extended mounting member, wherein the extended mounting member has a flat outer surface defining a plurality of attachment locations, and each attachment location is configured to facilitate attachment of the fixture to the extended mounting member; and
a plurality of securing members, wherein each securing member has an inner surface shaped to conform to the tubular structure and each securing member is configured to removably attach to the extended mounting member at a position along the extended mounting member so as to removably secure the extended mounting member to the tubular structure, thereby securing the fixture to the tubular structure.

15. The mount of claim 14, wherein the flat outer surface of the extended mounting member includes one or more mounting holes configured to accept bolts to couple the extended mounting member to the fixture to be mounted on the tubular structure.

16. The mount of claim 14, where the flat outer surface of the extended mounting member includes an L-track tie-down rail formed in the flat outer surface configured to accept L-track fasteners attached to the fixture to be mounted on the tubular structure.

17. The mount of claim 14, wherein the inner surface of the extended mounting member is shaped to mate with and conform to the tubular structure having a circular cross-section.

18. The mount of claim 14, wherein the inner surface of the extended mounting member is shaped to mate with and conform to the tubular structure having a rectangular cross-section.

19. The mount of claim 14, wherein the extended mounting member is monolithic in construction.

* * * * *

UNITED STATES PATENT AND TRADEMARK OFFICE
CERTIFICATE OF CORRECTION

PATENT NO. : 10,556,546 B2  
APPLICATION NO. : 15/493473  
DATED : February 11, 2020  
INVENTOR(S) : Thomas Burton Page 1 of 2

It is certified that error appears in the above-identified patent and that said Letters Patent is hereby corrected as shown below:

In the Claims

Column 7, Line 44 reading:
"extended mounting member and the and the flat"
Should be:
--extended mounting member and the flat--

Column 7, Line 45 reading, in part:
"each mating surface having defines"
Should be:
--each mating surface defines--

Column 7, Line 47 reading:
"each securing member having further comprises"
Should be:
--each securing member further comprises--

Column 7, Line 57 reading, in part:
"mounting member co as to securely"
Should be:
--mounting member to securely--

Column 7, Lines 65-66 reading, in part:
"towards the extending mounting element"
Should be:
--toward the extended mounting member--

Column 9, Lines 7-8 reading, in part:
"toward the extending mounting element"

Signed and Sealed this  
Seventh Day of July, 2020

Andrei Iancu  
*Director of the United States Patent and Trademark Office*

Should be:
--toward the extended mounting member--